US012683245B2

(12) United States Patent
    Kim et al.

(10) Patent No.: US 12,683,245 B2
(45) Date of Patent: Jul. 14, 2026

(54) SEPARATOR AND ELECTROCHEMICAL DEVICE INCLUDING THE SAME

(71) Applicants: W-SCOPE KOREA CO.,LTD., Cheongju-si (KR); W-SCOPE CHUNGJU PLANT CO., LTD, Chungju-si (KR)

(72) Inventors: Byung Hyun Kim, Cheongwon-gu (KR); Dae Bog Park, Cheonan-si (KR); Seok Hyeon Gong, Gongju-si (KR); Kwang Ho Choi, Cheongju-si (KR); Jeong Rae Kim, Seoul (KR)

(73) Assignees: W-SCOPE KOREA CO., LTD., Cheongju-si (KR); W-SCOPE CHUNGJU PLANT CO., LTD, Chungju-si (KR)

( * ) Notice: Subject to any disclaimer, the term of this patent is extended or adjusted under 35 U.S.C. 154(b) by 511 days.

(21) Appl. No.: 18/362,708

(22) Filed: Jul. 31, 2023

(65) Prior Publication Data

US 2023/0378607 A1 Nov. 23, 2023

Related U.S. Application Data

(63) Continuation of application No. PCT/KR2022/003175, filed on Mar. 7, 2022.

(30) Foreign Application Priority Data

May 27, 2021 (KR) ........................ 10-2021-0068389

(51) Int. Cl.
    *H01M 50/446* (2021.01)
    *H01M 4/62* (2006.01)
    (Continued)

(52) U.S. Cl.
    CPC ......... *H01M 50/446* (2021.01); *H01M 4/623* (2013.01); *H01M 50/417* (2021.01);
    (Continued)

(58) Field of Classification Search
    CPC .. H01M 50/446; H01M 50/417; H01M 50/42; H01M 50/434; H01M 50/449;
    (Continued)

(56) References Cited

U.S. PATENT DOCUMENTS

2015/0064529 A1 3/2015 Nagai et al.
2015/0263325 A1* 9/2015 Honda ................ H01M 50/434
                                                                429/144
(Continued)

FOREIGN PATENT DOCUMENTS

CN 112490588 A 3/2021
JP H08-339818 A 12/1996
(Continued)

OTHER PUBLICATIONS

International Search Report issued in PCT/KR2022/003175; mailed Jun. 17, 2022.

*Primary Examiner* — Matthew W Van Oudenaren
(74) *Attorney, Agent, or Firm* — Studebaker Brackett PLLC

(57) ABSTRACT

One aspect of the present invention provides a separator including a porous substrate, and a heat-resistant layer disposed on at least one surface of the porous substrate and including inorganic particles, wherein the ratio (F2/F1) of air permeability (F2, sec/100 mL) in a curved surface with a radius of curvature of 10 mm of the separator to the air permeability (F1, sec/100 mL) in a flat surface of the separator is 1.5 or less, and an electrochemical device including the same.

10 Claims, 1 Drawing Sheet

(51) Int. Cl.

| | |
|---|---|
| *H01M 50/417* | (2021.01) |
| *H01M 50/431* | (2021.01) |
| *H01M 50/449* | (2021.01) |
| *H01M 50/457* | (2021.01) |
| *H01M 50/489* | (2021.01) |

(52) U.S. Cl.
CPC ........ *H01M 50/431* (2021.01); *H01M 50/449* (2021.01); *H01M 50/457* (2021.01); *H01M 50/489* (2021.01)

(58) Field of Classification Search
CPC ............. H01M 50/451; H01M 50/489; H01M 50/414; H01M 50/431; H01M 50/457
See application file for complete search history.

(56) References Cited

U.S. PATENT DOCUMENTS

| | | | |
|---|---|---|---|
| 2017/0040584 A1 | 2/2017 | Kurakane et al. | |
| 2017/0294638 A1 | 10/2017 | Joo et al. | |
| 2018/0301760 A1* | 10/2018 | You ..................... | H01M 50/136 |
| 2020/0010607 A1 | 1/2020 | Hollmann et al. | |
| 2020/0106072 A1 | 4/2020 | Yogo et al. | |

FOREIGN PATENT DOCUMENTS

| | | |
|---|---|---|
| JP | 2014-007165 A | 1/2014 |
| JP | 2016-155385 A | 9/2016 |
| JP | 2020-053343 A | 4/2020 |
| WO | 2013/153619 A1 | 10/2013 |

* cited by examiner

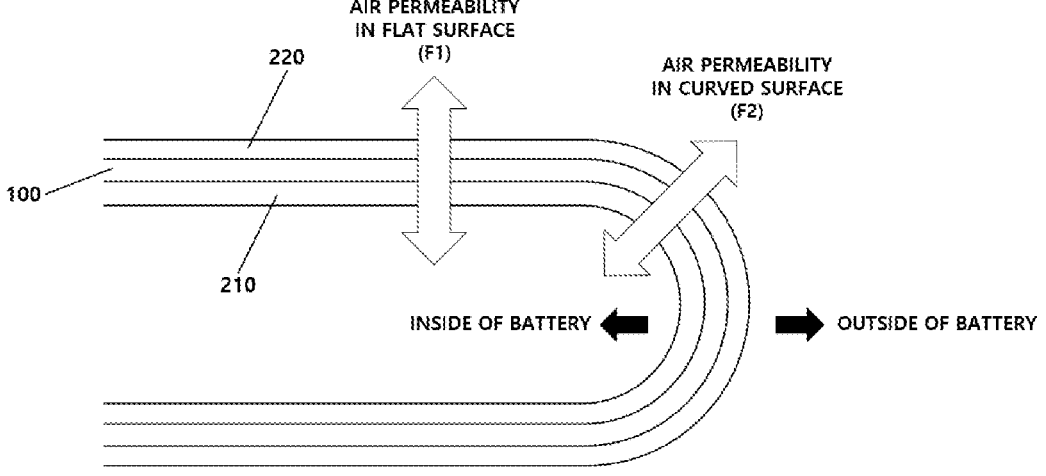

SEPARATOR AND ELECTROCHEMICAL DEVICE INCLUDING THE SAME

CROSS-REFERENCE TO RELATED APPLICATION

This application is based on the PCT Application No. PCT/KR2022/003175, filed on Mar. 7, 2022, and claims the benefit of priority from Korean Patent Application No. 10-2021-0068389, filed on May 27, 2021, the disclosures of which are incorporated herein by reference in its entirety.

TECHNICAL FIELD

The present invention relates to a separator and an electrochemical device including the same, and more particularly, to a separator that minimizes the variation in air permeability for each part in a battery, and an electrochemical device including the same.

BACKGROUND ART

Lithium secondary batteries are widely used as power sources for various types of electrical products requiring miniaturization and a light weight, such as smart phones, notebook computers, tablet PCs, etc., and as the application field is widened from smart grids to mid-to-large-size batteries for electric vehicles, the development of lithium secondary batteries with high capacity, a long lifetime, and high stability is required.

To attain the above purpose, research and development for separators with micropores, which separate a positive electrode and a negative electrode from each other to prevent an internal short, and facilitate the migration of lithium ions, and particularly, a microporous separator using a polyolefin such as polyethylene, which is advantageous for forming pores by thermally-induced phase separation, economical, and easily meets the physical properties required for separators, are actively being conducted.

However, a separator using polyethylene with a low melting point of approximately 135° C. may undergo shrinkage and transformation at a high temperature above the melting point due to heat generation of a battery. When a short circuit occurs due to such a transformation, the thermal runaway of the battery may cause safety problems such as ignition.

Meanwhile, a polyolefin-based separator, which has been conventionally used in a wide range, has poor heat resistance and mechanical strength, so when exposed to a temperature of 150° C. for approximately 1 hour, 50 to 90% thermal shrinkage occurs, resulting in loss of the function of the separator, and a high possibility of internal short circuit in case of an external impact. To compensate for this problem, a technique of coating a heat-resistant layer containing ceramic particles on the surface of the separator has been proposed.

However, this heat-resistant layer faces considerable technical challenges in terms of air permeability and conductivity (resistance), which are factors having a very important effect on separator performance. That is, when a heat-resistant layer including ceramic particles is formed on the surface of a porous substrate, the heat resistance of the separator is improved, but the ceramic particles included in the heat-resistant layer block the pores formed in the porous substrate to reduce the air permeability of the separator and thus greatly reduce an ion migration path between the positive electrode and the negative electrode, resulting in greatly reducing the charge and discharge performance of the secondary battery. In addition, as the heat-resistant layer is continuously exposed to an electrolyte in the battery, the ceramic particles may be partially and continuously detached from the porous substrate, and in this case, the heat resistance of the separator may also be gradually decreased.

The above problems are more prominent in areas with a small radius of curvature of the separator that is wound and bent by forming layers with the electrodes in a cylindrical and/or pouch-type battery. Specifically, referring to the FIGURE, when heat-resistant layers 210 and 220, which are symmetrical in terms of composition, thickness, and density, are formed on both surfaces of the porous substrate 100, a heavier load is applied to the heat-resistant layer 210 formed on one side facing the inside of the battery in the curved area of the separator, compared to the heat-resistant layer 220 formed on the other side, so the density of the heat-resistant layer 210 formed on one side facing the inside of the battery in the curved area is increased compared to that of the flat area, and the density of the heat-resistant layer 220 formed on the other side is reduced compared to that of the flat area.

When the density of the heat-resistant layer disposed on one side of the separator is arbitrarily increased in the curved area, the performance of the separator implemented in the curved area in terms of, for example, air permeability, ionic conductivity, and resistance, is considerably reduced compared to a measured/evaluated value based on the flat area, and particulate matter contained in the heat-resistant layer is arbitrarily detached by an unnecessary load.

DISCLOSURE

Technical Problems

To solve the above-described problems in the related art, the present invention is directed to providing a separator that can resolve the problem in that air permeability, ionic conductivity and resistance are reduced by a load applied to a heat-resistant layer in a curved area of the separator in a battery, and an electrochemical device including the same.

Technical Solutions

One aspect of the present invention provides a separator that includes a porous substrate, and a heat-resistant layer disposed on at least one surface of the porous substrate and including inorganic particles, wherein the ratio (F2/F1) of air permeability (F2, sec/100 mL) in a curved surface with a radius of curvature of 10 mm of the separator to the air permeability (F1, sec/100 mL) in a flat surface of the separator is 1.5 or less.

In one embodiment, the porous substrate may include one selected from the group consisting of polyethylene, polypropylene, polybutylene, polymethyl pentene, ethylene vinyl acetate, ethylene butyl acrylate, ethylene ethyl acrylate, and a combination or copolymer of two or more thereof.

In one embodiment, the separator may include a first heat-resistant layer disposed on one surface of the porous substrate, and a second heat-resistant layer included on the other surface of the porous substrate, wherein the density of the first heat-resistant layer may be smaller than that of the second heat-resistant layer.

In one embodiment, the first and second heat-resistant layers may face the inside and outside of the battery in which an electrode assembly having electrodes on both surfaces of the separator is wound or curved according to the present specifications, respectively.

In one embodiment, the first heat-resistant layer includes first inorganic particles and a first binder that adheres at least some of the first inorganic particles at predetermined intervals. The first binder includes a water-insoluble polymer, the content of the water-insoluble polymer in the first binder may be 40 to 90 wt %, and the density of the first heat-resistant layer may be 1.6 $g/m^2$ or less.

In one embodiment, the second heat-resistant layer includes second inorganic particles and a second binder that adheres at least some of the second inorganic particles at predetermined intervals. The second binder may include a water-soluble polymer, the content of the water-soluble polymer in the second binder may be 70 wt % or more, and the density of the second heat-resistant layer may be 1.7 $g/m^2$ or more.

In one embodiment, the first and second inorganic particles may each be one selected from the group consisting of $SiO_2$, $AlO(OH)$, $Mg(OH)_2$, $Al(OH)_3$, $TiO_2$, $BaTiO_3$, $Li_2O$, LiF, LiOH, $Li_3N$, BaO, $Na_2O$, $Li_2CO_3$, $CaCO_3$, $LiAlO_2$, $Al_2O_3$, SiO, SnO, $SnO_2$, $PbO_2$, ZnO, $P_2O_5$, CuO, MoO, $V_2O_5$, $B_2O_3$, $Si_3N_4$, $CeO_2$, $Mn_3O_4$, $Sn_2P_2O_7$, $Sn_2B_2O_5$, $Sn_2BPO_6$, and a combination of two or more thereof.

In one embodiment, the water-insoluble polymer may be one selected from the group consisting of polyvinylidene fluoride, polyvinylidene fluoride-hexafluoropropylene, polyvinylidene fluoride-trichloroethylene, polymethylmethacrylate, polyacrylonitrile, ethylene vinyl acetate, polyvinyl butyral, an acrylonitrile-acrylic acid copolymer, an ethylene-acrylic acid copolymer, a styrene-butadiene copolymer, an alkyl acrylate-acrylonitrile copolymer, an acryl-styrene copolymer, acrylic rubber, and a combination of two or more thereof.

In one embodiment, the water-soluble polymer may be one selected from the group consisting of polyacrylic acid, polyvinylpyrrolidone, polyvinyl acetate, polyimide, cellulose acetate, cellulose acetate butyrate, cellulose acetate propionate, cyanoethyl pullulan, cyanoethyl polyvinyl alcohol, cyanoethyl cellulose, hydroxyethyl cellulose, cyanoethyl sucrose, pullulan, carboxymethylcellulose, polyvinyl alcohol, polyethylene oxide, polyethylene glycol, and a combination of two or more thereof.

Another aspect of the present invention provides an electrochemical device, preferably, a secondary battery, and more preferably, a lithium secondary battery or a lithium-ion battery, which includes the separator.

Advantageous Effects

A separator according to one aspect of the present invention includes a porous substrate, and a porous substrate, and a heat-resistant layer disposed on at least one surface of the porous substrate and including inorganic particles, wherein the ratio (F2/F1) of air permeability (F2, sec/100 mL) in a curved surface of the separator with a radius of curvature of 10 mm to air permeability (F1, sec/100 mL) in a flat surface of the separator is 1.5 or less, and the problem of reducing air permeability, ionic conductivity, and resistance by a load applied to a heat-resistant layer in the curved area of the separator in a battery can be appropriately resolved.

It should be understood that the effects of the present invention are not limited to the above-described effects, and includes all effects that can be deduced from the configuration of the present invention described in the detailed description or claims of the present invention.

DESCRIPTION OF DRAWING

The FIGURE is a cross-sectional view of a separator according to one embodiment of the present invention.

MODES OF THE INVENTION

Hereinafter, the present invention will be described in detail with reference to the accompanying drawings. However, the present invention may be implemented in a variety of different forms, and is not limited to the embodiments described herein. In addition, in the drawings, for clear explanation of the present invention, parts that are not related to the description are omitted, and like numerals denote like parts throughout the specification.

Throughout the specification, when a part is "connected" with another part, it means that the one part is "directly connected," or "indirectly connected" with a third member therebetween. In addition, when a certain part "includes" a certain component, it means that, unless particularly stated otherwise, another component may be further included, rather than excluding the other component.

Hereinafter, embodiments of the present invention will be described in detail with reference to the accompanying drawings.

One aspect of the present invention provides a separator that includes a porous substrate, and a heat-resistant layer disposed on at least one surface of the porous substrate and containing inorganic particles, wherein the ratio (F2/F1) of air permeability (F2, sec/100 mL) in a curved surface of the separator with a radius of curvature of 10 mm to air permeability (F1, sec/100 mL) in a flat surface of the separator is 1.5 or less.

The porous substrate may include multiple pores with a substantially uniform average size, and these pores may contribute to the improvement of the resistance characteristic and ionic conductivity of the separator. In addition, the separator may be formed as a thin film with a required thickness due to having high porosity and high mechanical strength.

The porosity of the porous substrate may be 30 to 90 vol %, preferably, 40 to 80 vol %, and more preferably, 40 to 70 vol %. The term "porosity" used in the specification refers to the ratio of the volume occupied by pores to the total volume in any porous article. When the porosity of the porous substrate is less than 30 vol %, air permeability and ionic conductivity may be degraded, and when the porosity of the porous substrate is more than 90 vol %, mechanical properties such as tensile strength and puncture strength may be degraded.

The average size of the pores included in the porous substrate may be 10 to 100 nm, preferably, 20 to 80 nm, and more preferably, 30 to 60 nm. When the average pore size is less than 10 nm, air permeability and ionic conductivity may be degraded, and when the average pore size is more than 100 nm, mechanical properties such as tensile strength and puncture strength may be degraded.

The thickness of the porous substrate may be 5 to 20 μm, preferably, 5 to 15 μm, and more preferably, 5 to 12 μm to form a thinner electrochemical device with higher energy density. When the thickness of the porous substrate is less than 5 μm, mechanical properties may be degraded, and when the thickness of the porous substrate is more than 20 μm, air permeability and ionic conductivity may be degraded.

When the porous substrate includes a polymer resin having an electrical insulation property, the polymer resin may include a thermoplastic resin in consideration of shutdown characteristics. The term "shutdown characteristic" used in the specification refers to the obstruction of ion migration by the blockage of a porous substrate with a melted polymer resin when the temperature of a battery is increased by overheating. From this point of view, the melting point of the polymer resin or the thermoplastic resin may be 200° C. or less.

The thermoplastic resin may include, for example, one selected from the group consisting of polyethylene, polypropylene, polybutylene, polymethyl pentene, ethylene vinyl acetate, ethylene butyl acrylate, ethylene ethyl acrylate, and a combination or copolymer of two or more thereof, preferably, at least one of polyethylene and polypropylene, and more preferably, polyethylene, but the present invention is not limited thereto.

The polyethylene may be one selected from the group consisting of ultra-high-molecular weight polyethylene (UHMWPE, Mw: 1,000,000 to 7,000,000 g/mol), high-molecular weight polyethylene (HMWPE, Mw: 100,000 to 1,000,000 g/mol), high-density polyethylene (HDPE, Mw: 100,000 to 1,000,000 g/mol), low-density polyethylene (LDPE, Mw: 10,000 to 100,000 g/mol), homogeneous linear polyethylene, and linear low-density polyethylene (LLDPE), and a combination of two or more thereof.

For example, the polyethylene may be high-density polyethylene having a weight average molecular weight ($M_w$) of 250,000 to 450,000. When the weight average molecular weight ($M_w$) of the polyethylene is more than 450,000, viscosity may increase and processability may decrease, and when the weight average molecular weight ($M_w$) of the polyethylene is less than 250,000, viscosity is excessively low, resulting in extremely low dispersion of a pore-forming agent, an antioxidant, etc. when used to form a porous substrate.

The porous substrate may be hydrophilized to sufficiently secure the wettability of a slurry when coating the slurry for forming the heat-resistant layer, thereby improving the binding strength between the porous substrate and the heat-resistant layer. The contact angle of the hydrophilized porous substrate to moisture ($H_2O$) may be 150 or less, and the absolute value of a zeta potential measured as a negative value (−) on the surface of the porous substrate may be 10 mV or more, preferably, 15 mV or more, and more preferably, 20 mV or more.

Since a hydrophilic group, e.g., —$SO_3$, generated on the surface of the hydrophilized porous substrate and the surface of an internal pore is hydrophilic, the hydrophilized porous substrate may be easily bonded with the heat-resistant layer due to high affinity for the slurry, which is intrinsically hydrophilic, and the binding strength of the hydrophilized porous substrate may also be reinforced to considerably improve the durability of the separator, and since the loss of a hydrophilic group included in the porous substrate and/or inorganic particles of the heat-resistant layer is minimized, ionic conductivity and heat resistance may be improved.

The separator may be disposed on at least one surface of the porous substrate, and may include a heat-resistant layer including inorganic particles. The heat-resistant layer may also include a plurality of pores through which a fluid and/or ions can pass.

The content of the inorganic particles in the heat-resistant layer may be 60 to 99 wt %. When the content of the inorganic particles is less than 60 wt %, heat resistance may not be imparted to a required level, and when the content of the inorganic particles is more than 99 wt %, the air permeability, ionic conductivity, and resistance of the separator may be reduced, and the dispersibility of the inorganic particles, or workability and processability in slurry coating may be degraded.

The average particle diameter of the inorganic particles may be larger than the average size of the pores included in the porous substrate. When the average particle diameter of the inorganic particles is less than the average size of the pores included in the porous substrate, the inorganic particles may penetrate into the pores of the porous substrate to block the pores, thereby significantly reducing the air permeability and ionic conductivity of the separator. The average particle diameter of the inorganic particles may be 100 to 1,000 nm, preferably, 200 to 800 nm, and more preferably, 400 to 800 nm, but the present invention is not limited thereto.

The thickness of the heat-resistant layer may be 0.1 to 5 μm. When the thickness of the heat-resistant layer is less than 0.1 μm, a required level of heat resistance may not be imparted, and when the thickness of the heat-resistant layer is more than 5 μm, the separator becomes thicker, and thus the manufacture of a smaller electrochemical device and the integration of an electrochemical device may be inhibited.

The FIGURE is a cross-sectional view of a separator according to one embodiment of the present invention. Referring to the FIGURE, the separator according to one embodiment of the present invention may include a first heat-resistant layer 210 disposed on one surface of the porous substrate 100, and a second heat-resistant layer 220 disposed on the other surface of the porous substrate 100. The density of the first heat-resistant layer 210 may be smaller than that of the second heat-resistant layer 220. The term "density" used herein refers to a weight per unit area according to an area direction of the first or second heat-resistant layer, and is also referred to as "planar density" and is represented in units of $g/m^2$.

When the heat-resistant layers 210 and 220, which are symmetrical in terms of composition, thickness, and density, are formed on both surfaces of the porous substrate 100 as in the related art, a greater load is applied to the heat-resistant layer 210 formed on one side facing the inside of a battery in the curved area of the separator, compared to that of the heat-resistant layer 220 formed on the other side thereof. Therefore, the density of the heat-resistant layer 210 formed on one side facing the inside of the battery in the curved area is increased compared to that in the flat area, and the density of the heat-resistant layer 220 formed on the other side thereof is decreased compared to that of the flat area.

When the density of the heat-resistant layer disposed on one side of the separator in the battery, particularly, in the curved area, is arbitrarily increased as described above, the performance of the separator implemented in the curved area, for example, air permeability, ionic conductivity, and resistant, are considerably degraded in the flat area, compared to measured and evaluated values, and particulate matter contained in the heat-resistant layer is arbitrarily detached due to an unnecessary load.

Accordingly, the first and second heat-resistant layers 210 and 220 disposed on both surfaces of the porous substrate 100 may face the inside and outside of a battery in which an electrode assembly having electrodes on both surfaces of the separator is wound or bent according to a predetermined specification, respectively. That is, in the electrode assembly and/or the battery including the same, the first heat-resistant layer 210 faces the inside of the electrode assembly and/or the battery including the same, and the second heat-resistant layer 220 faces the outside of the electrode assembly and/or the battery including the same.

In addition, as the density of the first heat-resistant layer 210 is adjusted to be smaller than that of the second heat-resistant layer 220, the difference in density between the first and second heat-resistant layers 210 and 220, generated in the curved area, may be mitigated by the assembly of electrode assembly and/or a battery including the same.

Since the first heat-resistant layer 210 faces the inside of a battery when an electrode assembly for battery assembly is wound and/or bent, the radius of curvature of the first heat-resistant layer 210 is smaller than that of the second heat-resistant layer 220, and as the area of the interface between the first heat-resistant layer 210 and the porous substrate 100 is reduced, the density of the first heat-resistant layer 210 designed to be lower than that of the second heat-resistant layer 220 is increased. On the other hand, since the second heat-resistant layer 220 faces the outside of the battery, the radius of curvature thereof is higher than that of the first heat-resistant layer 210, and as the area of the interface between the second heat-resistant layer 220 and the porous substrate 100 is increased, the density of the second heat-resistant layer 220 designed to be higher than that of the first heat-resistant layer 210 is decreased.

In the curved area, when the density of the first heat-resistant layer 210 designed to be lower than that of the second heat-resistant layer 220 is increased, and the density of the second heat-resistant layer 220 designed to be higher than that of the first heat-resistant layer 210 is reduced, the densities of the first and second heat-resistant layers 210 and 220 may converge to an arbitrary intervening value, thereby suitably resolving the problem of degrading air permeability, ionic conductivity, and resistance due to a load applied to the first heat-resistant layer 210 in the curved area of the separator in a battery including the wound and/or bent electrode assembly.

When the difference in density between the first and second heat-resistant layers 210 and 220 is mitigated, the ratio (F2/F1) of air permeability (F2, sec/100 mL) in a curved surface of the separator with a radius of curvature of 10 mm to air permeability (F1, sec/100 mL) in a flat surface of the separator may be 1.5 or less, preferably, 1.0 to 1.3, more preferably, 1.0 to 1.2, and most preferably, 1.0 to 1.1. When the ratio (F2/F1) is more than 1.5, air permeability, ionic conductivity, and resistance in the curved area of an electrode assembly and/or a battery including the same may be considerably degraded compared to the flat area thereof, resulting in deteriorated electrochemical characteristics of the battery.

The term "curved surface" used in the specification refers to a surface with a predetermined radius of curvature, a line bent at a predetermined angle and its periphery, generated by winding and/or bending of an electrode assembly including an electrode-separator-electrode, and the "flat surface" used in the specification refers to a region excluding the curved surface.

The air permeability (F1, sec/100 mL) in the flat surface of the separator may be measured using a device such as a Curley meter while a specimen is fixed on a flat surface, and the air permeability (F2, sec/100 mL) in the curved surface of the separator, having the radius of curvature of 10 mm, may be measured using the same apparatus while a sample is wound around a cylinder with a diameter of 20 mm, left for a predetermined time, and then fixed to the flat surface immediately after being unwound in an MD direction.

The first heat-resistant layer 210 may include first inorganic particles and a first binder that adheres at least some of the first inorganic particles at predetermined intervals, wherein the first binder includes a water-insoluble polymer, and the content of the water-insoluble polymer in the first binder may be 40 to 90 wt %, preferably, 60 to 90 wt %, and more preferably, 80 to 90 wt %. The density of the first heat-resistant layer 210 may be 1.6 $g/m^2$ or less, preferably, 1.0 to 1.5 $g/m^2$, and more preferably, 1.2 to 1.4 $g/m^2$.

The second heat-resistant layer 220 may include second inorganic particles and a second binder that adheres at least some of the second inorganic particles at predetermined intervals, wherein the second binder includes a water-soluble polymer, and the content of the water-soluble polymer in the second binder may be 70 wt % or more, preferably, 80 wt % or more, and more preferably, 90 wt % or more. The density of the second heat-resistant layer 220 may be 1.7 $g/m^2$ or more, preferably, 1.8 to 2.0 $g/m^2$, and more preferably, 1.85 to 1.95 $g/m^2$.

In addition, the difference in density between the first and second heat-resistant layers 210 and 220 may be 0.2 $g/m^2$ or more, preferably, 0.3 $g/m^2$ or more, more preferably, 0.5 $g/m^2$ or more, and most preferably 0.6 $g/m^2$ or more.

The term "water-insoluble polymer" used in the specification refers to a polymer having the characteristic of being dispersed or suspended in the form of microparticles in water without being dissolved in water, and is referred to a latex or emulsion. The water-insoluble polymer may be formed in the form of microparticles in the first heat-resistant layer 210, and may form and maintain pores together with the first inorganic particles. The average particle diameter of the water-insoluble polymer may be 50 to 300 nm. When the average particle diameter of the water-insoluble polymer is less than 50 nm, the air permeability and ionic conductivity of the separator may be degraded, and when the average particle diameter of the water-insoluble polymer is more than 300 nm, the surface area of the heat-resistant layer may be reduced, thereby degrading adhesiveness and resistance.

Meanwhile, the term "water-soluble polymer" used in the specification refers to a polymer that is dissolved in water and has the characteristic of not exhibiting the form of particles. The water-soluble polymer may be melted and fused to the second heat-resistant layer 220 not only to adhere the second inorganic particles to each other but to adhere the second inorganic particles to the porous substrate 100.

The remainder of the first binder may include a water-soluble polymer, and the remainder of the second binder may include a water-insoluble polymer.

The water-insoluble polymer may be, for example, one selected from the group consisting of polyvinylidene fluoride, polyvinylidene fluoride-hexafluoropropylene, polyvinylidene fluoride-trichloroethylene, polymethylmethacrylate, polyacrylonitrile, ethylene vinyl acetate, polyvinyl butyral, an acrylonitrile-acrylic acid copolymer, an ethylene-acrylic acid copolymer, a styrene-butadiene copolymer, an alkyl acrylate-acrylonitrile copolymer, an acryl-styrene copolymer, acrylic rubber, and a combination of two or more thereof, but the present invention is not limited thereto.

The water-soluble polymer may be, for example, one selected from the group consisting of polyacrylic acid, polyvinylpyrrolidone, polyvinyl acetate, polyimide, cellulose acetate, cellulose acetate butyrate, cellulose acetate propionate, cyanoethyl pullulan, cyanoethyl polyvinyl alcohol, cyanoethyl cellulose, hydroxyethyl cellulose, cyanoethyl sucrose, pullulan, carboxymethylcellulose, polyvinyl alcohol, polyethylene oxide, polyethylene glycol, and a combination of two or more thereof.

The first and second inorganic particles may each be one selected from the group consisting of $SiO_2$, $AlO(OH)$, $Mg(OH)_2$, $Al(OH)_3$, $TiO_2$, $BaTiO_3$, $Li_2O$, $LiF$, $LiOH$, $Li_3N$, $BaO$, $Na_2O$, $Li_2CO_3$, $CaCO_3$, $LiAlO_2$, $Al_2O_3$, $SiO$, $SnO$, $SnO_2$, $PbO_2$, $ZnO$, $P_2O_5$, $CuO$, $MoO$, $V_2O_5$, $B_2O_3$, $Si_3N_4$, $CeO_2$, $Mn_3O_4$, $Sn_2P_2O_7$, $Sn_2B_2O_5$, $Sn_2BPO_6$, and a combination of two or more thereof, and preferably, the first inorganic particles may be cuboidal $AlO(OH)$, and the second inorganic particles may be spherical $Al_2O_3$, but the present invention is not limited thereto.

Hereinafter, examples of the present invention will be described in detail.

Preparation Example 1-1

A high-density slurry, which has a solid content of 20 wt % and a density of 1.8 $g/m^3$, was prepared by dispersing 92 parts by weight of alumina, 2 parts by weight of a water-soluble acrylic copolymer, 5 parts by weight of carboxymethylcellulose (CMC), 0.5 parts by weight of a surfactant, and 0.5 parts by weight of a dispersant $((NaPO_3)_6)$.

Preparation Example 1-2

A high-density slurry, which has a solid content of 20 wt % and a density of 1.92 $g/m^3$, was prepared by dispersing 92 parts by weight of alumina, 7 parts by weight of carboxymethylcellulose (CMC), 0.5 parts by weight of a surfactant, and 0.5 parts by weight of a dispersant $((NaPO_3)_6)$.

Preparation Example 1-3

A high-density slurry, which has a solid content of 20 wt % and a density of 1.74 $g/m^3$, was prepared by dispersing 92 parts by weight of alumina, 2 parts by weight of a water-soluble acrylic copolymer, 5 parts by weight of carboxymethylcellulose (CMC), 0.5 parts by weight of a surfactant, and 0.5 parts by weight of a dispersant $((NaPO_3)_6)$.

Preparation Example 2-1

A low-density slurry, which has a solid content of 20 wt % and a density of 1.27 $g/m^3$, was prepared by dispersing 94 parts by weight of boehmite, 4.5 parts by weight of an acryl-acrylonitrile copolymer, 0.5 parts by weight of polyvinyl alcohol, 0.5 parts by weight of a surfactant, and 0.5 parts by weight of a dispersant $((NaPO_3)_6)$.

Preparation Example 2-2

A low-density slurry, which has a solid content of 20 wt % and a density of 1.3 $g/m^3$, was prepared by dispersing 94 parts by weight of boehmite, 4 parts by weight of an acryl-acrylonitrile copolymer, 1 part by weight of polyvinyl alcohol, 0.5 parts by weight of a surfactant, and 0.5 parts by weight of a dispersant $((NaPO_3)_6)$.

Preparation Example 2-3

A low-density slurry, which has a solid content of 20 wt % and a density of 1.36 $g/m^3$, was prepared by dispersing 94 parts by weight of boehmite, 3 parts by weight of an acryl-acrylonitrile copolymer, 2 parts by weight of polyvinyl alcohol, 0.5 parts by weight of a surfactant, and 0.5 parts by weight of a dispersant $((NaPO_3)_6)$.

Preparation Example 2-4

A low-density slurry, which has a solid content of 20 wt % and a density of 1.41 $g/m^3$, was prepared by dispersing 94 parts by weight of boehmite, 2 parts by weight of an acryl-acrylonitrile copolymer, 3 parts by weight of polyvinyl alcohol, 0.5 parts by weight of a surfactant, and 0.5 parts by weight of a dispersant $((NaPO_3)_6)$.

Preparation Example 2-5

A low-density slurry, which has a solid content of 20 wt % and a density of 1.53 $g/m^3$, was prepared by dispersing 94 parts by weight of boehmite, 1 part by weight of an acryl-acrylonitrile copolymer, 4 parts by weight of polyvinyl alcohol, 0.5 parts by weight of a surfactant, and 0.5 parts by weight of a dispersant $((NaPO_3)_6)$.

Examples and Comparative Examples

Both surfaces of a polyethylene porous substrate (air permeability: 110 sec/100 mL) with a thickness of 9 μm were bar-coated with a low-density and/or high-density slurry obtained in each Preparation Example and then dried, thereby preparing a separator specimen which includes a heat-resistant layer with a thickness of 2 μm on each of both surfaces of the porous substrate.

A slurry used to form coating layers on both surfaces, that is, the outer surface and the inner surface, of the separator specimen is shown in Table 1 below. In the table below, the "outer surface" of the separator refers to a surface that faces the outside of a battery when an electrode structure including the separator is wound and/or bent in battery assembly, and the "inner surface" of the separator refers to a surface that faces the inside of a battery as the surface opposite to the "outer surface" of the separator.

TABLE 1

| Classification | Outer surface of separator | Inner surface of separator |
|---|---|---|
| Example 1 | Preparation Example 1-1 | Preparation Example 2-1 |
| Example 2 | Preparation Example 1-1 | Preparation Example 2-2 |
| Example 3 | Preparation Example 1-1 | Preparation Example 2-3 |
| Example 4 | Preparation Example 1-1 | Preparation Example 2-4 |
| Example 5 | Preparation Example 1-1 | Preparation Example 2-5 |
| Example 6 | Preparation Example 1-2 | Preparation Example 2-1 |
| Example 7 | Preparation Example 1-2 | Preparation Example 2-2 |
| Example 8 | Preparation Example 1-2 | Preparation Example 2-3 |
| Example 9 | Preparation Example 1-2 | Preparation Example 2-4 |
| Example 10 | Preparation Example 1-2 | Preparation Example 2-5 |
| Example 11 | Preparation Example 1-3 | Preparation Example 2-1 |
| Example 12 | Preparation Example 1-3 | Preparation Example 2-2 |
| Example 13 | Preparation Example 1-3 | Preparation Example 2-3 |
| Example 14 | Preparation Example 1-3 | Preparation Example 2-4 |
| Example 15 | Preparation Example 1-3 | Preparation Example 2-5 |
| Comparative Example 1 | Preparation Example 1-1 | Preparation Example 1-1 |
| Comparative Example 2 | Preparation Example 2-2 | Preparation Example 2-2 |
| Comparative Example 3 | Preparation Example 2-2 | Preparation Example 1-1 |
| Comparative Example 4 | Preparation Example 1-2 | Preparation Example 1-2 |

Experimental Example

Test methods for each of the physical properties measured in the present invention are as follows. When there is no separate mention about temperatures, the physical properties were measured at room temperature (25° C.).

The physical properties of the separator specimens prepared according to Examples and Comparative Examples were measured, and the results are shown in Table 2 below.

Air permeability (Gurley, sec/100 mL): After measuring the air permeability for the time for passing 100 mL of air through a separator specimen with a diameter of 29.8 mm under a measurement pressure of 0.025 MPa using an EGO2-5 model, which is a Gurley meter (Densometer, Asahi Semiko Co., Ltd.) (F1), the separator specimen was wound around a cylinder with a diameter of 20 mm in an MD direction, and left for 6 hours, followed by measuring the air permeability in the same manner immediately after unwinding (F2).

Thermal shrinkage (%): After the separator specimen with a size of 200×200 mm was put between A4 sheets of paper and left in a 150° C. oven for 1 hour, the separator specimen was cooled at room temperature, and the length of the specimen that shrank in a machine direction (MD) was measured, and thermal shrinkage was calculated using the following equation.

$$\text{Thermal shrinkage } (\%)=(l_3-l_4)/l_3*100$$

(In the equation, $l_3$ is a machine direction length of the specimen before shrinkage, and $l_4$ is a machine direction length of the specimen after shrinkage.)

TABLE 2

| Classification | F1 | F2 | F2/F1 | Thermal shrinkage |
|---|---|---|---|---|
| Example 1 | 147 | 154 | 1.05 | 2.9 |
| Example 2 | 151 | 171 | 1.13 | 2.3 |
| Example 3 | 154 | 186 | 1.21 | 2.2 |
| Example 4 | 155 | 200 | 1.29 | 2.1 |
| Example 5 | 161 | 233 | 1.45 | 2 |
| Example 6 | 156 | 158 | 1.01 | 2.2 |
| Example 7 | 159 | 164 | 1.03 | 2.1 |
| Example 8 | 160 | 166 | 1.04 | 2 |
| Example 9 | 163 | 178 | 1.09 | 2 |
| Example 10 | 165 | 219 | 1.33 | 2 |
| Example 11 | 141 | 165 | 1.17 | 2.9 |
| Example 12 | 143 | 179 | 1.25 | 2.9 |
| Example 13 | 146 | 200 | 1.37 | 2.3 |
| Example 14 | 151 | 213 | 1.41 | 2.2 |
| Example 15 | 153 | 228 | 1.49 | 2.1 |
| Comparative Example 1 | 156 | 267 | 1.71 | 1.9 |
| Comparative Example 2 | 148 | 1240 | 1.62 | 4.2 |
| Comparative Example 3 | 150 | 281 | 1.87 | 2.3 |
| Comparative Example 4 | 173 | 349 | 2.02 | 1.8 |

It should be understood by those of ordinary skill in the art that the above description of the present invention is exemplary, and the exemplary embodiments disclosed herein can be easily modified into other specific forms without departing from the technical spirit or essential features of the present invention. Therefore, the exemplary embodiments described above should be interpreted as being illustrative and not restrictive in any aspect. For example, each component described as a single unit may be distributed and implemented, and components described as being distributed may also be implemented in combined form.

The scope of the present invention is defined by the appended claims and encompasses all modifications and alterations derived from the meanings, scope and equivalents of the appended claims.

DESCRIPTION OF REFERENCE NUMERALS

100: Porous substrate

210: Low-density heat-resistant layer (first heat-resistant layer)

220: High-density heat-resistant layer (second heat-resistant layer)

The invention claimed is:

1. A separator comprising:
a porous substrate
a first heat-resistant layer disposed on one surface of the porous substrate and comprising first inorganic particles; and
a second heat-resistant layer included on an opposite surface of the porous substrate and comprising second inorganic particles,
wherein a density of the first heat-resistant layer is smaller than a density of the second heat-resistant layer,
wherein a ratio (F2/F1) of air permeability (F2, sec/100 mL) in a curved surface of the separator with a radius of curvature of 10 mm to air permeability (F1, sec/100 mL) in a flat surface of the separator is 1.0 to 1.5.

2. The separator of claim 1, wherein the porous substrate comprises one selected from the group consisting of polyethylene, polypropylene, polybutylene, polymethyl pentene, ethylene vinyl acetate, ethylene butyl acrylate, ethylene ethyl acrylate, and a combination or copolymer of two or more thereof.

3. The separator of claim 1, wherein when the separator is incorporated in a battery having an electrode assembly in which electrodes are disposed on both surfaces of the separator and wound or bent according to a predetermined specification,
the first heat-resistant layer faces an inside of the battery and the second heat-resistant layer faces an outside of the battery.

4. The separator of claim 3, wherein the first heat-resistant layer further comprises a first binder that adheres at least some of the first inorganic particles at predetermined intervals,
the first binder comprises a water-insoluble polymer,
a content of the water-insoluble polymer in the first binder is 40 to 90 wt %, and
the density of the first heat-resistant layer is 1.6 g/m² or less.

5. The separator of claim 4, wherein the second heat-resistant layer further comprises a second binder that adheres at least some of the second inorganic particles at predetermined intervals,
the second binder comprises a water-soluble polymer,
a content of the water-soluble polymer in the second binder is 70 wt % or more, and
the density of the second heat-resistant layer is 1.7 g/m² or more.

6. The separator of claim 1, wherein the first inorganic particles are one selected from the group consisting of $SiO_2$, $AlO(OH)$, $Mg(OH)_2$, $Al(OH)_3$, $TiO_2$, $BaTiO_3$, $Li_2O$, $LiF$, $LiOH$, $Li_3N$, $BaO$, $Na_2O$, $Li_2CO_3$, $CaCO_3$, $LiAlO_2$, $Al_2O_3$, $SiO$, $SnO$, $SnO_2$, $PbO_2$, $ZnO$, $P_2O_5$, $CuO$, $MOO$, $V_2O_5$, $B_2O_3$, $Si_3N_4$, $CeO_2$, $Mn_3O_4$, $Sn_2P_2O_7$, $Sn_2B_2O_5$, $Sn_2BPO_6$, and a combination of two or more thereof.

7. The separator of claim 1, wherein the second inorganic particles are one selected from the group consisting of $SiO_2$, $AlO(OH)$, $Mg(OH)_2$, $Al(OH)_3$, $TiO_2$, $BaTiO_3$, $Li_2O$, $LiF$, $LiOH$, $Li_3N$, $BaO$, $Na_2O$, $Li_2CO_3$, $CaCO_3$, $LiAlO_2$, $Al_2O_3$, $SiO$, $SnO$, $SnO_2$, $PbO_2$, $ZnO$, $P_2O_5$, $CuO$, $MoO$, $V_2O_5$, $B_2O_3$, $Si_3N_4$, $CeO_2$, $Mn_3O_4$, $Sn_2P_2O_7$, $Sn_2B_2O_5$, $Sn_2BPO_6$, and a combination of two or more thereof.

8. The separator of claim 4, wherein the water-insoluble polymer is one selected from the group consisting of polyvinylidene fluoride, polyvinylidene fluoride-hexafluoropropylene, polyvinylidene fluoride-trichloroethylene, polymethylmethacrylate, polyacrylonitrile, ethylene vinyl acetate, polyvinyl butyral, an acrylonitrile-acrylic acid copolymer, an ethylene-acrylic acid copolymer, a styrene-butadiene copolymer, an alkyl acrylate-acrylonitrile copolymer, an acryl-styrene copolymer, acrylic rubber, and a combination of two or more thereof.

9. The separator of claim 5, wherein the water-soluble polymer is one selected from the group consisting of polyacrylic acid, polyvinylpyrrolidone, polyvinyl acetate, polyimide, cellulose acetate, cellulose acetate butyrate, cellulose acetate propionate, cyanoethyl pullulan, cyanoethyl polyvinyl alcohol, cyanoethyl cellulose, hydroxyethyl cellulose, cyanoethyl sucrose, pullulan, carboxymethylcellulose, polyvinyl alcohol, polyethylene oxide, polyethylene glycol, and a combination of two or more thereof.

10. An electrochemical device, comprising the separator of claim 1.

\*　\*　\*　\*　\*